United States Patent [19]

Fishburne

[11] Patent Number: 4,614,264

[45] Date of Patent: Sep. 30, 1986

[54] METHOD AND APPARATUS FOR CONVEYING WEIGHED AMOUNTS OF MATERIAL

[76] Inventor: Francis B. Fishburne, Arden, N.C.

[21] Appl. No.: 790,249

[22] Filed: Oct. 22, 1985

Related U.S. Application Data

[63] Continuation-in-part of Ser. No. 621,764, Jun. 18, 1984, abandoned.

[51] Int. Cl.[4] .................. B65G 11/08; B65G 43/10
[52] U.S. Cl. ........................... 198/505; 198/572; 198/577; 177/121
[58] Field of Search .............. 198/505, 572, 577, 575, 198/603, 606, 607, 461, 347, 565, 571; 177/119, 120, 121

[56]  References Cited

U.S. PATENT DOCUMENTS

| | | | |
|---|---|---|---|
| 2,496,548 | 2/1950 | La Rosa et al. | 198/505 |
| 3,118,512 | 1/1964 | Fishburne | 198/505 X |
| 3,720,039 | 3/1973 | Warkentin | 177/121 X |
| 4,135,615 | 1/1979 | Brackman et al. | 198/371 |
| 4,225,001 | 9/1980 | Gillenkirch | 177/119 X |

FOREIGN PATENT DOCUMENTS

| | | | |
|---|---|---|---|
| 2747491 | 4/1979 | Fed. Rep. of Germany | 198/347 |
| 1564077 | 4/1969 | France | 177/119 |

Primary Examiner—Joseph E. Valenza
Assistant Examiner—Michael Stone
Attorney, Agent, or Firm—Roylance, Abrams, Berdo & Goodman

[57]  ABSTRACT

For supplying tobacco from a redryer to a packer, the invention provides apparatus comprising four consecutive conveyors, the first conveyor operating continuously in one direction to feed tobacco from the redryer to the second conveyor, the second conveyor being reversible to act selectively as a holding conveyor and a supply tobacco to the third conveyor, the third conveyor being a weighing conveyor operated at a slower speed to weight and at a faster speed to deliver the weight quantities onto the fourth conveyor which carries the successive weighed quantities of tobacco to the packer. The conveyors are so controlled that the weighed quantities, when on the fourth conveyor, are spaced apart by intervals and the packer is operated through a packing cycle during each such interval.

5 Claims, 7 Drawing Figures

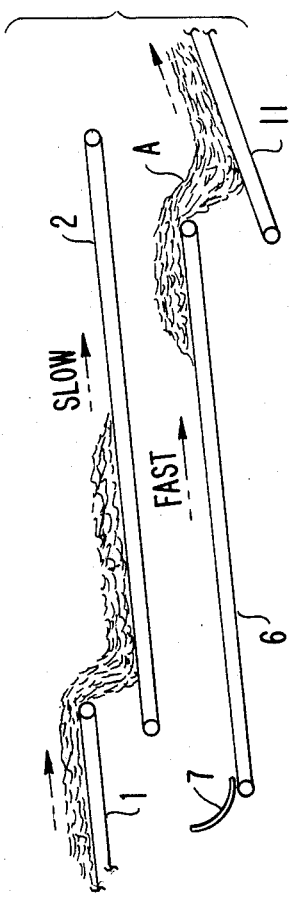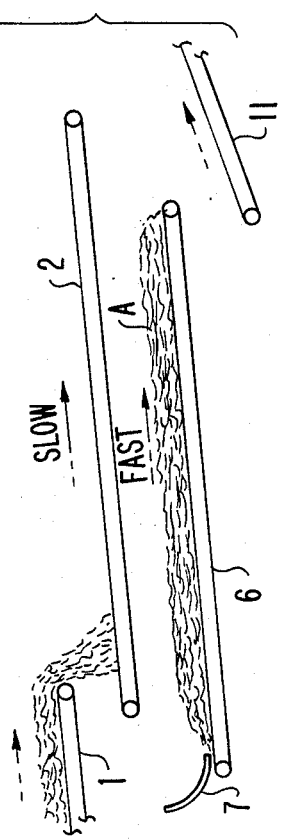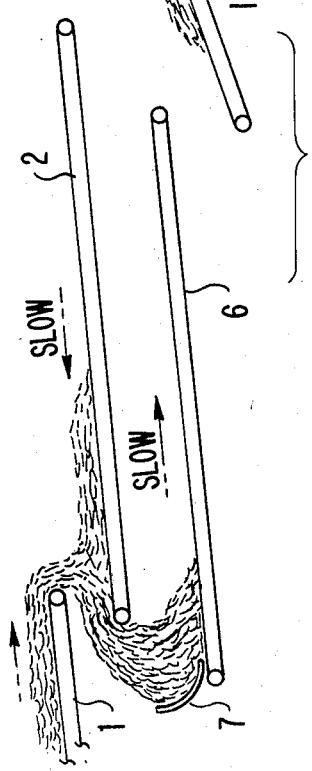

4,614,264

METHOD AND APPARATUS FOR CONVEYING WEIGHED AMOUNTS OF MATERIAL

RELATED APPLICATION

This application is a continuation-in-part of my copending application Ser. No. 621,764, filed June 18, 1984 and now abandoned.

This invention relates to methods and apparatus for conveying weighed amounts of material, particularly loose material such as tobacco, and to methods for operating apparatus, such as tobacco packers, supplied with loose material.

Background of the Invention

In the processing of loose materials, it has long been the practice to convey the loose material continuously from a source at a constant rate, as by a continuously operating endless belt conveyor, and to package the material so supplied in equal quantities. When it is possible to make the initial supply of the material intermittent, so that equal periods of time are available for each packaging operation without the periods of time being directly dependent upon the initial supply rate, no special problems are encountered. However, there are instances in which the nature of the source of the loose material is such that conveying of the material from the source cannot be interrupted. Thus, for example, it has long been conventional in the tobacco industry to feed tobacco from a redryer to a packer, with the packer being operated to compact the tobacco into cases, bales or hogsheads. Redryers operate continuously and at a relatively high rate, and the packer therefore must be operated at such a rate as to satisfy the demands of the redryer output since it is not practical to shut a redryer down. Accordingly, packers of the vertically acting type have been developed which have relatively short cycle times, on the order of 35 seconds, in which the amount of tobacco required for a case, etc., is packed. Even so, the fact that the redryer delivers tobacco continuously which the packer operates in cycles and cannot accept tobacco while a cycle is in progress has caused problems in arriving at an efficient total operation. One prior art approach to solving such problems has been to employ a holding conveyor or conveyors to accept tobacco from the redryer during those periods when the packer cannot accept more tobacco. However, prior art use of holding conveyors has not met with favor in some factories, and there has been a continuing need for improvement.

In the case of a vertically acting tobacco packer, the loose tobacco is supplied into an upright tubular structure called a charger, and the combination of the charger and, e.g., case at the open bottom end of the charger can be considered broadly as a container. Similar problems arise when the continuously supplied loose material is simply to be delivered to open top drums, for example, supplied sequentially to a filling station.

SUMMARY OF THE INVENTION

According to the invention, a first conveyor is operated to carry the loose material from the source and deposit the material continuously and at a substantially constant rate onto a reversible endless second conveyor; the second conveyor is operated in one direction to feed the material onto the input end of an endless variable speed third conveyor constructed and arranged to weigh the material as the material is deposited thereon; the third conveyor is operated at a first relatively slow rate until a predetermined weight of material has been deposited thereon by the second conveyor, whereupon the third conveyor is shifted to a second relatively fast rate and the second conveyor is reversed to stop its feed to the third conveyor and commence operation as a holding conveyor, the third conveyor being operated at said second speed until the entire weighed quantity of material has been discharged. When the material is tobacco supplied continuously from a redryer, the third conveyor delivers the weighed quantity of tobacco onto a fourth conveyor arranged to supply the tobacco to the packer and, upon completion of discharge of the weighed quantity of tobacco onto the fourth conveyor, the second conveyor is again reversed to begin again to feed its held tobacco as well as incoming tobacco from the first conveyor onto the now empty third conveyor, the third conveyor being returned to its first relatively slow rate simultaneously with reversal of the second conveyor. The above steps are then repeated for as many cycles as are required for the time period of operation of the redryer and packer, the successive weighed quantities of tobacco received by the fourth conveyor being separated on the fourth conveyor by intervals determined by the rates of operation of the conveyors, the packer being operated through one complete packing cycle during each such interval. When loose material is to be supplied to drums, the drums are brought successively beneath the delivery end of the third conveyor by a stepwise conveying operation with each drum remaining stationary beneath the delivery end of the third conveyor for a time adequate for discharge of the weighed quantity of material into the drum.

IDENTIFICATION OF THE DRAWINGS

FIGS. 2–2C are successive sequence diagrams illustrating how the method is carried out with the system of FIG. 1;

DETAILED DESCRIPTION OF THE INVENTION

Figure 1:
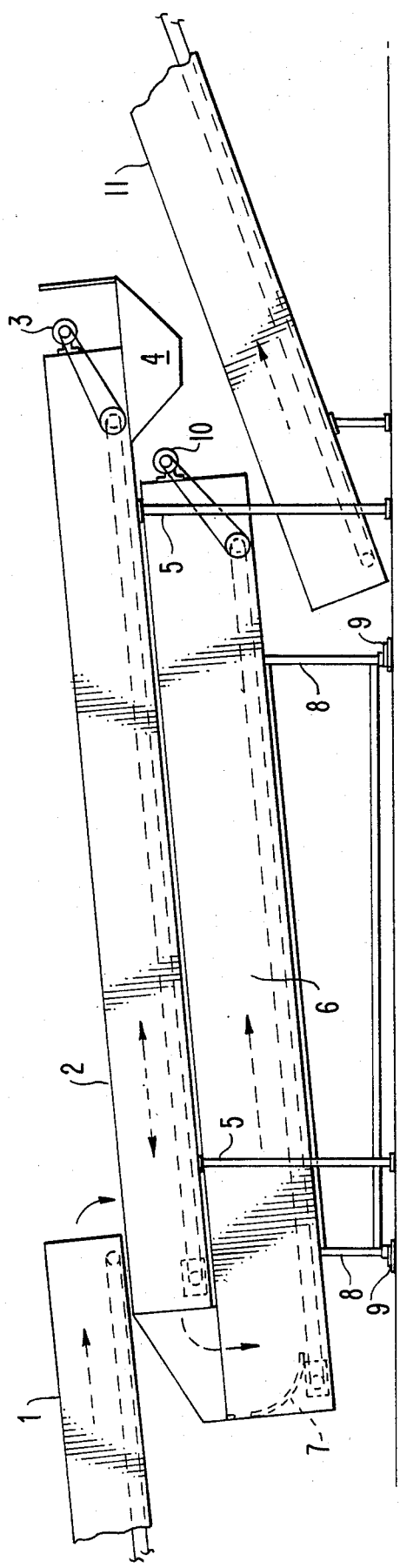
FIG. 1 is a side elevational view of a conveyor system according to one embodiment of the invention capable of carrying out the method of the invention for supplying tobacco from a redryer and operating a packer to pack the tobacco.

The Apparatus Embodiment of FIG. 1

As seen in FIG. 1, this embodiment of the invention employs a first endless belt conveyor 1 which is driven at a constant speed and delivers tobacco from the redryer (not shown) to a second endless belt conveyor 2. Conveyor 2 is reversible and is driven by a rotary motor 3 so that the speed at which the conveyor is driven depends upon the speed of the motor. Inclined upwardly, conveyor 2 is disposed with its lower end beneath the delivery end of conveyor 1. At its upper end, conveyor 2 is equipped with a chute 4 to receive tobacco in the envent that, while operating to carry the tobacco to the right, as viewed, more tobacco is received than the conveyor can accommodate. Conveyor 2 is rigidly supported by legs 5.

A third endless belt type conveyor 6 is located beneath conveyor 2 and is inclined similarly to conveyor 2. The lower end of conveyor 6 is located below and projects beyond the lower end of conveyor 2 so that, when conveyor 2 is operated to deliver tobacco to the left, as viewed, the delivered tobacco will fall upon the belt of conveyor 6 and be carried by that belt upwardly to the delivery end of conveyor 6. A curved deflector 7 is provided, as shown, at the receiving end of conveyor 6 to guide the tobacco as it falls from the lower end of conveyor 2. Conveyor 6 is supported by a frame comprising four legs 8 and a conventional load cell 9 is interposed between the lower end of each leg 8 and the supporting floor, so that conveyor 6 operates as a weighing conveyor, the load cells providing an electrical output signal, in conventional fashion, representative of the total weight of tobacco on the conveyor belt. Conveyor 6 is powered by a rotary motor 10 operative to drive the belt of the conveyor selectively either at a first relatively slower rate or a second relatively faster rate. The upper end of conveyor 6 is located above the receiving end of conveyor 11. Conveyor 11 is of the endless belt type driven in conventional fashion to carry tobacco received from conveyor 6 to the packer (not shown). In typical installations, the packer has its own conveyor, called a charger feed conveyor, for feeding the tobacco it receives from conveyor 11 into the charger of the packer preparatory to a packing stroke of the packer ram. The packers are usually quite tall and located some distance away from the redryer, so conveyor 11 can be quite long.

Carrying out the Method with the Apparatus of FIG. 1

Figure 2:
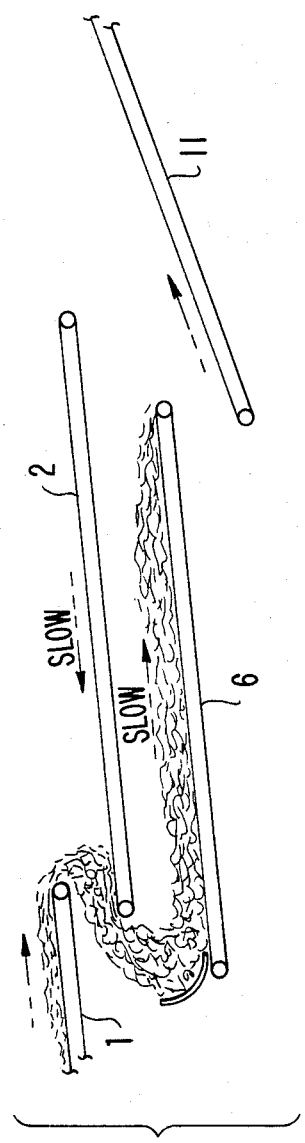

FIG. 2 illustrates how operation of the apparatus of FIG. 1 is commenced. On start-up, conveyor 1 is operated continuously at its constant rate while conveyor 2 is operated at a slow rate in a direction to feed the tobacco it receives from conveyor 1 onto the receiving end of the belt of conveyor 6 which, at this stage, is operated at its first, slower rate. Operation of conveyors 1, 2 and 6 continues in this fashion until load cells 9 detect the desired predetermined weight of tobacco, i.e., that weight required for one cycle of operation of the packer. When that weight occurs, two changes are made simultaneously. Thus, as indicated in FIG. 2A, conveyor 2 is reversed and conveyor 6 is shifted to its higher rate of travel. Thus, the additional tobacco being delivered by conveyor 1 is now carried to the right, as viewed, by conveyor 2 which now serves as a holding conveyor. Since reversal of conveyor 2 stopped the transfer of tobacco from conveyor 2 to conveyor 6, conveyor 6 now carries the predetermined weighed quantity of tobacco, indicated at A, which will satisfy one cycle of operation of the packer, and conveyor 6 is now moving at its higher rate. Accordingly, as seen in FIG. 2B, conveyor 6 delivers quantity A onto conveyor 11 while the amount of tobacco being held on conveyor 2, while constantly increasing because of the continued delivery of tobacco by conveyor 1, is still small enough to be accommodated. Delivery of quantity A onto conveyor 11 frees conveyor 6 of the tobacco weight. When this occurs, as detected by load cells 9, two changes in operation are made. Conveyor 2 is again reversed, so as to deliver its held tobacco, as well as tobacco incoming from conveyor 1, to conveyor 6. And conveyor 6 is shifted back to its slow speed so as to act again to accumulate the predetermined weight of tobacco necessary for one cycle of operation of the packer. This stage in the sequence of operations is shown in FIG. 2C.

From FIG. 2C, it will be noted that operation of the conveyors in the manner just described is effective to divide the constant feed of tobacco from conveyor 1 into individual increments, each of the same predetermined weight, and to locate those increments, such as quantity A, on conveyor 11 in such fashion that each successive pair of increments is separated, lengthwise of conveyor 11, by the same interval I, FIG. 2C, this interval being of long enough duration, in the light of the speed of conveyor 11, to allow one complete cycle of operation of the packer. Accordingly, the packer is operated so as to achieve one complete cycle of operation within each interval I.

Figure 3:
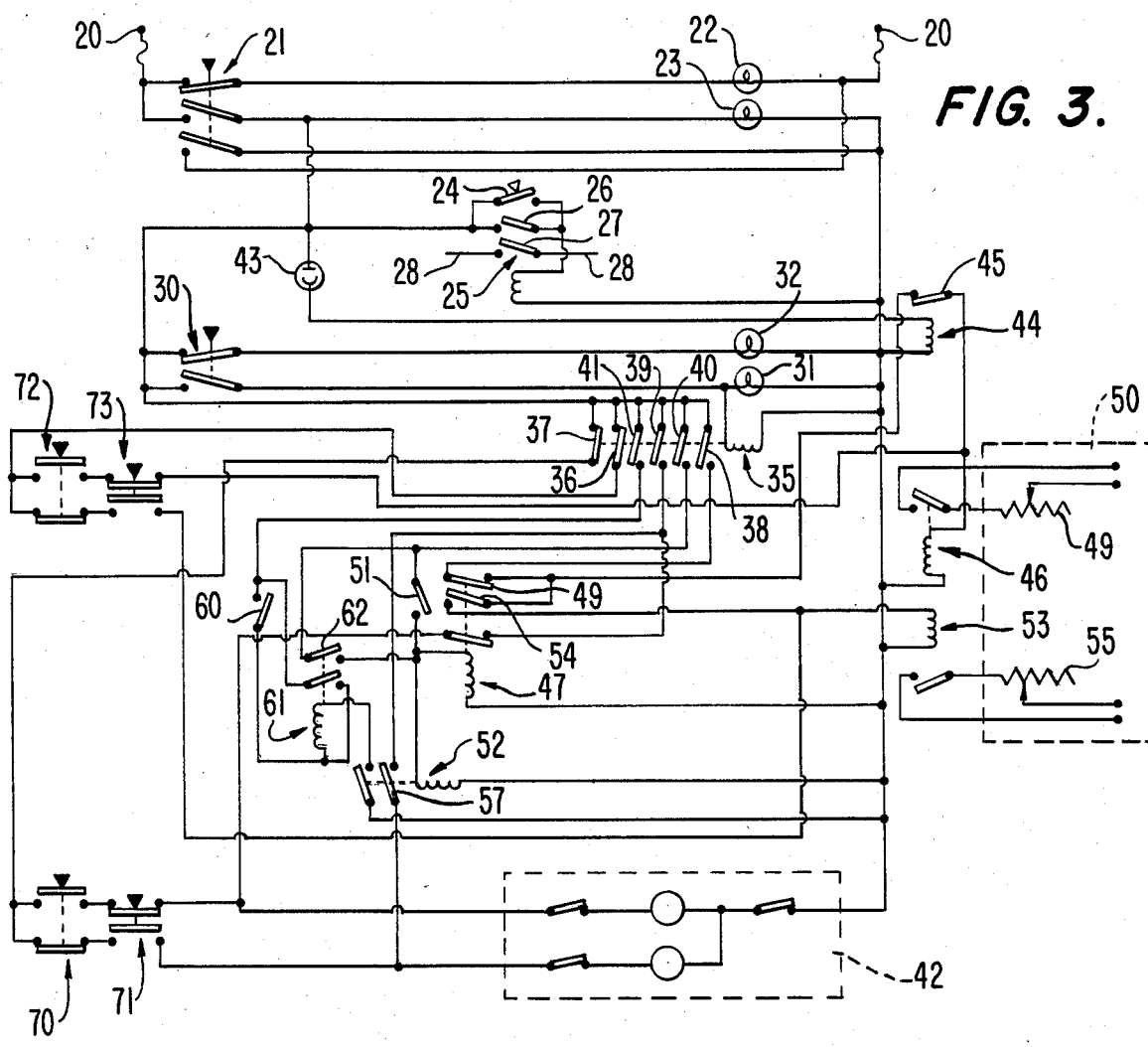
FIG. 3 is a schematic diagram of an electrical control system for the system of FIG. 1.

Control System of FIG. 3

FIG. 3 illustrates a typical electrical control system useful to control the apparatus of FIGS. 1-2C to practice the method embodiments of the invention. Power, typically 220 V. AC supplied from a 5 KVA transformer, is supplied via terminals 20 under control of a manual switch 21, with indicator lamp 22 energized when switch 21 is in its off position and indicator lamp 23 energized when switch 21 is in its on position. With switch 21 in its on position, momentary closing of manual pushbuttom switch 24 energizes relay 25 to close its two sets of normally open contacts 26 and 27, the relay being self-holding via contacts 26. When closed, contacts 27 complete a circuit via conductor 28 to the conventional motor control module and thereby render the motor control module operative. A manual switch 30 selects between automatic and manual operation and is shown in its position for manual operation, indicator lights 31 and 32 being provided to indicate, respectively, whether the automatic or manual mode is being used.

Relay 35 is energized when switch 30 is actuated to its automatic position. The relay has normally closed contacts 36 and 37 and normally open contacts 38–41, and energization of the relay opens contacts 36, 37 and closes contacts 38–41. The conventional motor starter 42 for reversible motor 3, FIG. 1, of conveyor 2 is so connected that, when contacts 39 are closed as a result of energization of relay 35, motor 3 is energized to drive motor 3 to the left, as viewed in FIGS. 1-2C, so that, with tobacco being supplied continuously by conveyor 1, conveyor 2 feeds the tobacco continuously to conveyor 6 in the manner shown in FIG. 2. A photoelectric cell 43, FIG. 3, is arranged to detect flow of tobacco from conveyor 2 to conveyor 6 and controls a relay 44, the relay being energized to hold its normally closed contacts 45 open so long as the photoelectric cell is energized by light from a suitable source (not shown) when tobacco is not being fed by conveyor 2 to conveyor 6, deenergization of the photoelectric cell when tobacco is being fed by conveyor 2 to conveyor 6 causing relay 44 to be deenergized so that contacts 45 then close. With contacts 39 of relay 35 closed, a relay 46 is energized, via normally closed contacts 48 of a relay 47, to close its normally open contacts and select potentiometer 49 of the conventional motor speed control module 50 for motor 10, FIG. 1, of conveyor 6, selection of potentiometer 49 causing motor 10 to drive conveyor 6 at its slower rate. Slow operation of conveyor 6 continues unless photoelectric cell 43 is again energized as a result of absence of the flow of tobacco from conveyor 2 to conveyor 6, in which event conveyor 6 stops.

When load cells 9 detect the desired weight of tobacco on conveyor 6, the conventional weighing system closes its contacts 51, causing relays 47 and 42 to be energized via contacts 39 of relay 35. Once energized, relays 47 and 52 are self-holding. Energization of relay 47 causes relay 53 to be energized, via contacts 54 of relay 47, to select potentiometer 55 of control module 50, so that motor 10 then drives conveyor 6 at its faster rate. Simultaneous energization of relays 47 and 52 also causes contacts 56 of relay 47 to open and contacts 57 of relay 52 to close, so that motor starter 42 reverses motor 3 and conveyor 2 therefore stops feeding tobacco to conveyor 6 and commences to operate as a holding conveyor. Conveyor 6 now continues to operate at its fast rate and discharges its entire weighed quantity of tobacco onto conveyor 11 while the tobacco continuing to be supplied by conveyor 1 accumulates on conveyor 2.

When load cells 9 detect zero tobacco weight, i.e., when conveyor 6 has discharged all of its weighed quantity of tobacco onto conveyor 11, the weighing device closes contacts 60, causing relay 61 to be energized. Relay 61 is a time delay relay and, after a brief adjustable delay, its contacts 62 open, interrupting the holding circuits for relays 47 and 52 so that those relays are deenergized so that motor starter 42 is connected to cause motor 3 to drive conveyor 2 to the left, as viewed in FIG. 1, and again feed tobacco to conveyor 6, motor 10 of conveyor 6 having again been connected to drive conveyor 6 at its slow rate.

For manual operation of conveyor 2, when switch 30 is in its manual position, two push button switches 70 and 71 are connected, as shown, to control motor starter 42, switch 70 serving to cause motor 3 to drive conveyor to the left, as viewed, so long as switch 70 is held depressed, and switch 71 serving to cause motor 3 to drive the conveyor in the opposite direction, so long as the switch is depressed. Similarly switches 72 and 73 are connected to control module 50 to cause motor 10 to drive conveyor 6 at a slow rate, so long as switch 72 is depressed, and at a high rate, so long as switch 73 is depressed.

Figure 4:
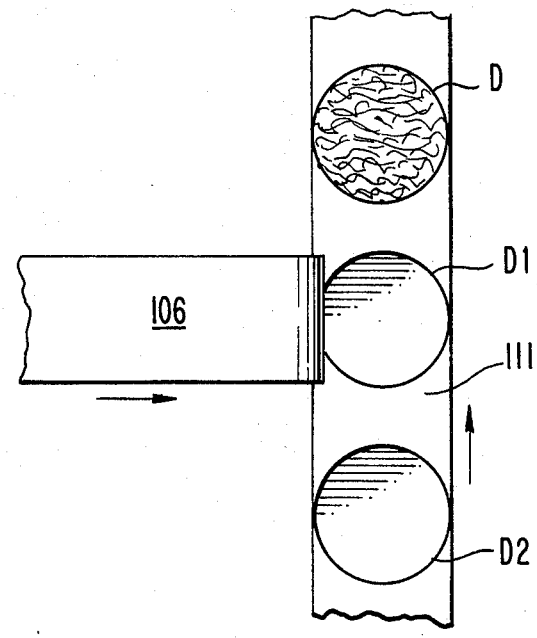
FIG. 4 is a plan elevational view of a portion of the conveyor system of FIG. 1 adapted to fill successive containers.

The Embodiment Of FIG. 4

FIG. 4 illustrates an embodiment of the invention adapted for delivery of the weighed quantities of loose material directly into sequentially presented open top drums. Here, the weighing conveyor 106 is identical to conveyor 6, FIGS. 1–3, and is supplied with loose material by a system of conveyors identical to conveyors 1 and 2, FIGS. 1–3, but not shown in FIG. 4. Open top drums are carried stepwise beneath the delivery end of conveyor 106 by a horizontal conveyor 111, stepwise operation of conveyor 111 being such that each newly presented drum is held stationary beneath the delivery end of conveyor 106 for a time period long enough to allow conveyor 106 to discharge its entire weighed quantity of material into the drum, the filled drum then being carried away from the delivery end of conveyor 106 and a new drum advanced to the delivery end of conveyor 106. Thus, a filled drum D is shown spaced away from the conveyor, an empty drum D1 is shown in position ready to receive material discharged by the conveyor, and another empty drum D2 is shown ready to be advanced to the filling position when drum D1, having been filled, is moved away to the position in which drum D is shown. It will be understood that stepwise operation of conveyor 111 is accomplished at a rate dependent upon operation of conveyor 106.

What is claimed is:

1. The method for supplying loose material in individual increments of equal weight when the loose material is delivered continuously from a source, comprising operating a first conveyor to carry the material from the source and deposit the material continuously at a substantially constant rate onto a reversible endless second conveyor; operating the second conveyor in one direction to feed material received from the first conveyor onto the input end of an endless variable speed third conveyor constructed and arranged to weigh the material as the material is deposited thereon; operating the third conveyor at a first relatively slow rate until a predetermined weight of material has been deposited thereon by the second conveyor and, upon occurrence of said predetermined weight,
  operating the third conveyor at a second relatively fast rate, and
  reversing the second conveyor so that the second conveyor ceases to supply tobacco to the third conveyor and operates as a holding conveyor still receiving material continuously from the first conveyor;
continuing to operate the third conveyor at said second speed until the entire weighed quantity of material has been discharged at a point of delivery; and
upon completion of discharge of the weighed quantity of material from the third conveyor
  again reversing the second conveyor to feed its held material as well as incoming material from the first conveyor onto the now empty third conveyor, and returning the third conveyor to said first relatively slow rate.

2. The method according to claim 1, wherein the weighed quantity of material is discharged by the third conveyor at said point of delivery onto a fourth conveyor,
  the steps of the method being repeated to cause a plurality of weighed quantities of material to be discharged from the third conveyor onto the fourth conveyor,
  the weighed quantities of material received by the fourth conveyor from the third conveyor being separated on the fourth conveyor by intervals determined by the rates of operation of the conveyors.

3. The method according to claim 2, wherein
the loose material is tobacco and the source is a tobacco redryer;
the weighed quantities of tobacco are delivered successively by the fourth conveyor to a tobacco packer;
the steps of the method are repeated for as many cycles as are required for the time period of operation of the redryer and the packer; and
the packer is operated through one complete cycle during each interval of separation of the weighed quantities of tobacco on the fourth conveyor.

4. In an apparatus for delivering successive individual quantities of loose material, with each quantity being of predetermined weight, when the loose material is supplied continuously, the combination of
a first elongated endless conveyor having
  a receiving end portion disposed to receive the continuously supplied loose material, and reversible first drive means operable to drive the first conveyor selectively in one direction, to discharge loose material from the receiving end portion, and in the opposite direction, to carry material away from the receiving end portion;

a second elongated endless conveyor having
- a receiving end portion disposed beneath the receiving end portion of the first conveyor to receive material therefrom when the first conveyor is driven in said one direction,
- a delivery end spaced from the receiving end portion of the second conveyor,
- second drive means operable to drive the second conveyor to carry material from the receiving end portion to the delivery end selectively at a first slower rate and a second faster rate, and
- weighing means operable to weigh the loose material on the second conveyor; and control means connected to the first and second drive means and responsive to the weighing means and operable to drive the first drive means to drive the first conveyor in said one direction to discharge material onto the second conveyor until a predetermined weight of material on the second conveyor is detected by the weighing means and to drive the second conveyor at said first slower rate while the predetermined weight of material is accumulating, to reverse the first conveyor and accelerate the second conveyor to said second faster rate in response to occurrence of the predetermined weight of material on the second conveyor, to continue operation of the second conveyor at said second faster rate and the first conveyor in said opposite direction until the entire weighed quantity of material has been discharged from the second conveyor, and to then reverse the direction of the first conveyor and return the second conveyor to its first slow rate preparatory to accumulation of another predetermined quantity of material on the second conveyor.

5. The combination defined in claim 4 and further comprising
a third elongated endless conveyor having
- a receiving end portion disposed to receive the material discharged from the delivery end of the second conveyor,
- the third conveyor being driven continuously in a direction to carry material from its receiving end portion to a point of discharge, whereby the weighed quantities of material delivered by the second conveyor to the third conveyor are spaced apart on the third conveyor by intervals determined by the rates of operation of the conveyors.

* * * * *